US012410641B2

(12) United States Patent
Singh et al.

(10) Patent No.: US 12,410,641 B2
(45) Date of Patent: Sep. 9, 2025

(54) DOOR HAVING INTEGRATED OPENING AND CLOSING MECHANISMS

(71) Applicant: Rivian IP Holdings, LLC, Irvine, CA (US)

(72) Inventors: Rajeev Kumar Singh, Dublin, OH (US); Stephen Paul Jones, Commerce Charter Township, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 126 days.

(21) Appl. No.: 17/561,005

(22) Filed: Dec. 23, 2021

(65) Prior Publication Data

US 2023/0203856 A1 Jun. 29, 2023

(51) Int. Cl.
*E05B 83/40* (2014.01)
*E05B 79/20* (2014.01)
*E05B 81/08* (2014.01)

(52) U.S. Cl.
CPC .............. *E05B 83/40* (2013.01); *E05B 81/08* (2013.01); *E05B 79/20* (2013.01)

(58) Field of Classification Search
CPC ........ E05B 85/10; E05B 85/14; E05B 1/0092; E05B 1/0046; E05B 83/02; E05B 83/04; E05B 83/40; E05B 81/08; Y10T 292/57; B61D 45/00; B61D 45/0497; B61D 45/06; B61D 45/062; B61D 45/12; B61D 45/125
See application file for complete search history.

(56) References Cited

U.S. PATENT DOCUMENTS

| | | | | |
|---|---|---|---|---|
| 3,625,544 A * | 12/1971 | Goodwin | B60J 5/0497 | 410/137 |
| 4,438,963 A * | 3/1984 | Friedrich | E05B 1/0038 | 292/168 |
| 4,502,246 A * | 3/1985 | Minami | E05F 5/003 | 49/213 |
| 5,172,947 A * | 12/1992 | Schap | E05B 81/22 | 292/201 |
| 6,135,513 A * | 10/2000 | Hamada | E05B 81/20 | 292/201 |
| 2016/0090760 A1* | 3/2016 | Rettig | E05C 17/36 | 292/264 |
| 2021/0214976 A1* | 7/2021 | Hiramoto | E05B 77/265 | |

FOREIGN PATENT DOCUMENTS

| | | |
|---|---|---|
| CN | 101929271 A | 12/2010 |
| WO | 2014/050617 A1 | 4/2014 |

* cited by examiner

*Primary Examiner* — Christine M Mills
*Assistant Examiner* — Yahya Sidky
(74) *Attorney, Agent, or Firm* — Haley Guiliano LLP

(57) ABSTRACT

Door configurations having integrated mechanisms for opening and releasing for closure, with elements of these mechanisms located on or largely on the body of the door itself. In some embodiments of the disclosure, a door has a handle and two release mechanisms coupled thereto, one of which releases a lock and allows the door to open, and the other of which releases a catch and allows the door to close. The two release mechanisms are coupled to the handle such that manipulating the handle in one direction actuates one of the release mechanisms but not the other, and manipulating the handle in the other direction actuates the other release mechanism. In this manner, manipulating the handle in one direction opens the door, and manipulating the handle in the other direction closes the door.

20 Claims, 6 Drawing Sheets

DOOR HAVING INTEGRATED OPENING AND CLOSING MECHANISMS

INTRODUCTION

The present disclosure is directed generally to vehicle doors. More specifically the present disclosure is directed to vehicle bulkhead doors having integrated opening and closing mechanisms.

SUMMARY

It is desirable for some doors, such as interior or bulkhead sliding doors of commercial vehicles, to open relatively easily, remain locked in an open position until closed, yet also slid shut relatively easily. For example, in the case of commercial package delivery vehicles, doors are designed to open relatively easily, so that they may be readily opened even when users are carrying packages. Such doors are also designed to remain open, to facilitate further movement of packages across the doorway and into or out of the vehicle. Finally, these doors are designed for relatively easy closure by users that may be carrying packages or otherwise occupied. Interior bulkhead door systems of, e.g., some commercial vehicles thus include mechanisms for easy opening, separate mechanisms for locking the door in the open position and releasing the door therefrom, and another mechanism for locking the door in the closed position. The number of such mechanisms, and the fact that at least some of these mechanisms are located, in part or in whole, off the door itself, often results in complex door systems that are expensive to fabricate and maintain, have a potentially greater number of failure modes, and occupy more packaging space.

Accordingly, systems and methods are disclosed herein for door configurations having integrated opening and closing mechanisms, with opening and closing actuation mechanisms both located on or largely on the body of the door itself. Embodiments of such systems are integrated onto the door to a greater degree, resulting in fewer components, lower associated costs, and reduced number of failure modes.

In some embodiments of the disclosure, a door has a handle and two release mechanisms coupled thereto, one of which releases a lock and allows the door to open, and the other of which releases a catch and allows the door to close. The two release mechanisms are coupled to the handle such that manipulating the handle in one rotational direction (e.g., a first direction) actuates one of the release mechanisms (e.g., releasing the catch and allowing the door to close) but not the other, and manipulating the handle in the other rotational direction (e.g., a second direction) actuates the other release mechanism (e.g., releasing the lock and allowing the door to open), but not the other. It will be understood that the first rotational direction is different than the second rotational direction. In this manner, manipulating the handle in one direction opens the door, and manipulating the handle in the other direction closes the door. As the door structure contains integrated opening and closing mechanisms, fewer parts are required external to the door, allowing for easier and cheaper incorporation of the door into larger structures such as vehicles, as well as fewer potential points of failure.

The door handle may be any handle suitable for actuation of the two release mechanisms. As one example, the handle may be a handle shaped for gripping and turning, pivotably attached to the door and configured to engage one of the release mechanisms when the handle is turned in the first rotational direction, and to engage the other release mechanism when turned in the second rotational direction. In another example, the handle may be shaped and configured for translation along an axis, such that one release mechanism is engaged when the handle is pushed or otherwise translated in a first direction, and the other release mechanism is engaged when the handle is pushed or otherwise translated in a second direction, where the first direction is opposite to the second direction.

Conditional engagement of the two release mechanisms based on the handle's direction of actuation may be accomplished in any suitable manner. As one example, a pair of linkages or other components may be coupled to the handle and shaped such that the handle or an extension thereof engages one linkage when the handle is moved in one direction, and engages the other linkage when the handle is moved in the other direction.

When engaged by the handle, one linkage engages a lock and unlock mechanism, opening the door. As one example, the linkage may engage an electrical switch such as a microswitch configured to transmit a signal across an air gap from the door to a lock mechanism, such as an electronic or electromagnetic lock, positioned external to the door and locking/unlocking the door. The signal may prompt the lock mechanism to unlock the door, such as by withdrawing a catch or a bolt. This may allow the door to be opened.

Fully opening the door may allow the door to engage a catch, or hold mechanism, that holds the door in its open position. The catch, or hold mechanism, partially composes a second release mechanism, which additionally includes a linkage configured for actuation by a handle when the handle is manipulated in a second direction (e.g., towards the door panel). Accordingly, a connector (e.g., the catch or hold mechanism, another mechanical linkage, etc.) coupled to the actuated linkage holds the door panel in its open position. Subsequently, when the handle is manipulated in a first direction (e.g., away from the door panel), a separate linkage may engage the hold mechanism, withdrawing the catch, and releasing the door for closure. The user may then close the door.

In this manner, a door having integrated release mechanisms may allow users to open the door by manipulating the handle in one direction, and releasing the door for closure by manipulating the handle in another direction. Allowing both opening and releasing for closure with a single handle provides a door that is more easily used, especially by users that are occupied by other tasks, such as carrying packages and the like. A door integrated in this manner is also more readily assembled, cheaper, and more reliable.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to door configurations having integrated mechanisms for opening and releasing for closure, with elements of these mechanisms located on or largely on the body of the door itself. In some embodiments of the disclosure, a door has a handle and two release mechanisms (e.g., actuation methods) coupled thereto, one of which releases a lock and allows the door to open, and the other of which releases a catch and allows the door to close. The two release mechanisms are coupled to the handle such that manipulating the handle in the first direction (e.g., towards the door panel) actuates one of the release mechanisms (first release mechanism 25) without actuating the other release mechanism (second release mechanism), and manipulating the handle in the second direction (e.g., away from the door panel) actuates the second release mechanism without actuating the first release mechanism 25. In this manner, manipulating the handle in the first direction opens the door, and manipulating the handle in the second direction closes the door. As the door structure contains integrated opening and closing mechanisms, fewer parts are required external to the door, allowing for easier and cheaper incorporation of the door into larger structures such as vehicles, as well as fewer potential points of failure.

Figure 1:
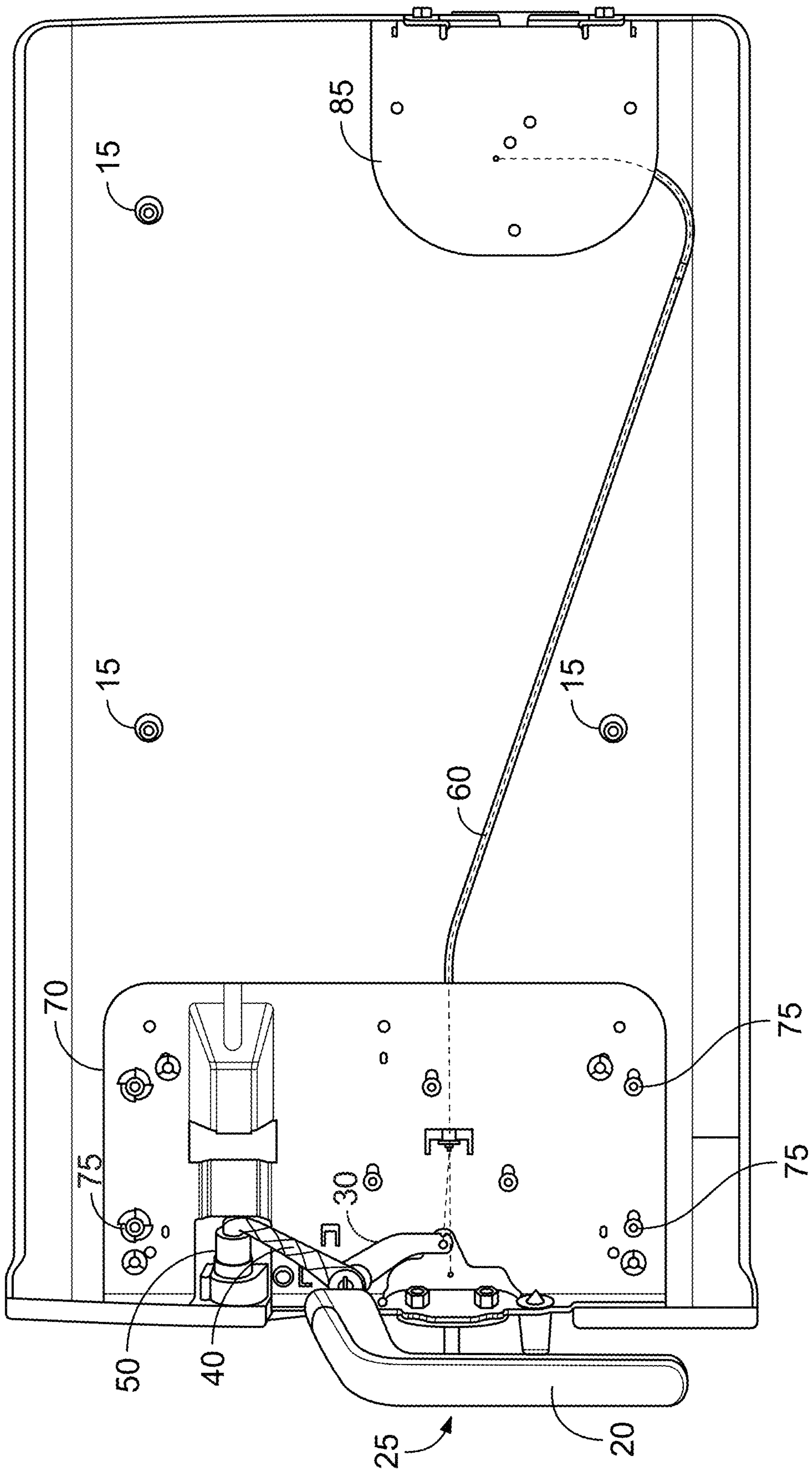
FIG. 1 is a side view of a side of a door panel showing a rotational handle and integrated release mechanisms, in accordance with embodiments of the disclosure.
Figure 2:
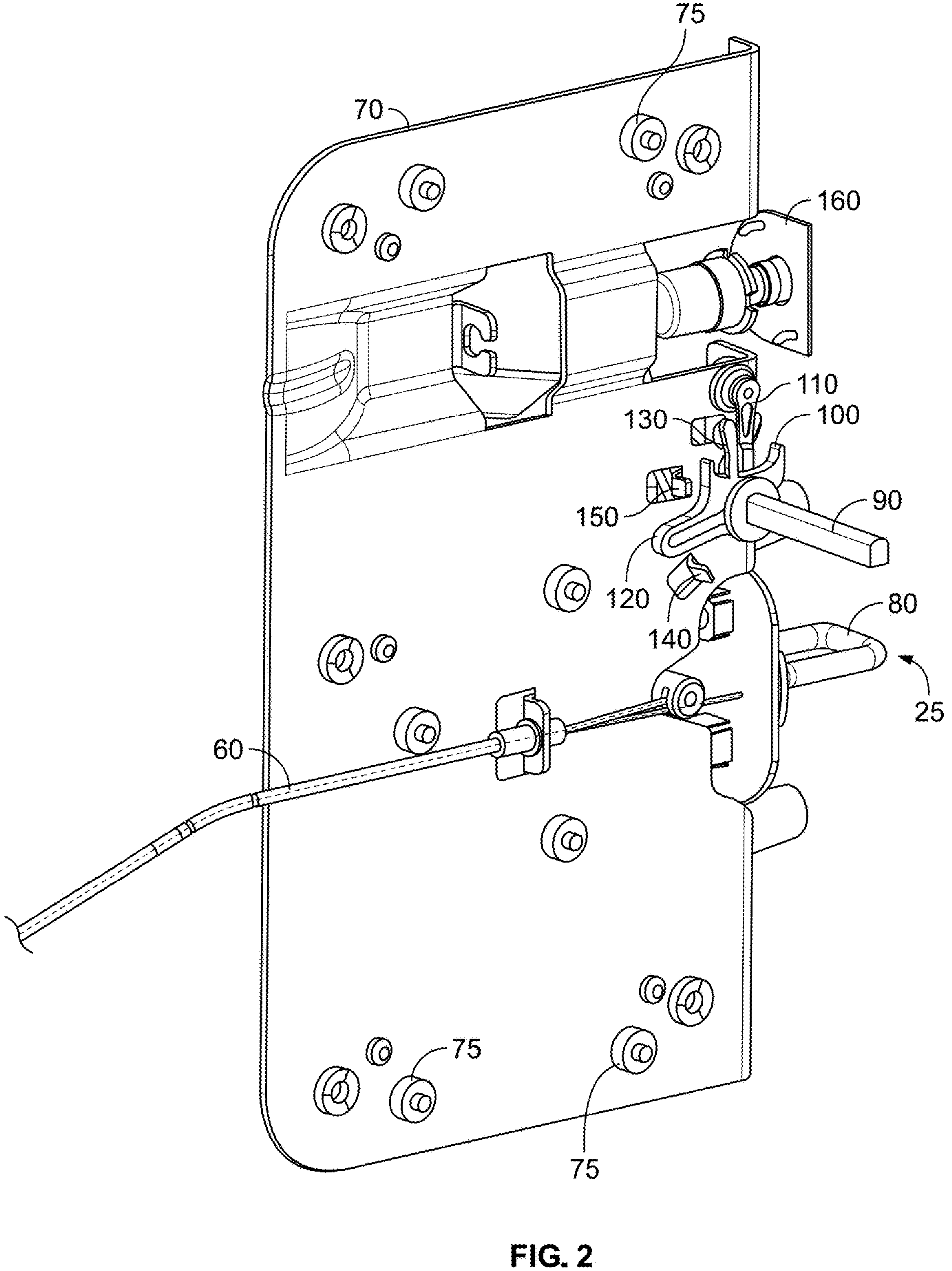
FIG. 2 is an isometric view of an opposite side of the door panel of FIG. 1, showing an opposite side of the handle and integrated release mechanisms, in accordance with embodiments of the disclosure.

FIG. 1 is a side view of a side of a door panel showing a rotational handle, a mounting plate, and integrated release mechanisms, in accordance with embodiments of the disclosure. FIG. 2 is an isometric view of an opposite side of the mounting plate of FIG. 1, showing an opposite side of the handle and integrated release mechanisms, in accordance with embodiments of the disclosure. Here, a door panel 10 of a door may be a rigid panel made of, e.g., pressed sheet metal, and configured for attachment to the body of a door. The door panel 10 may span substantially the entire width of its door, so that a first release mechanism 25 having a component such as loop 80 shown in FIG. 2 extends from one side of the door nearest the handle 20, to allow the door to lock, while a second release mechanism 85 extends from the opposite side of the door farthest from the handle 20, to catch and hold the door in its opened position and to release it therefrom when desired via connector 60 (e.g., the catch or hold mechanism, another mechanical linkage, etc.), which couples to linkage 30 of FIG. 1.

Door panel 10 has a mounting plate 70 on which parts of the mechanism 25 for locking/unlocking the door are mounted, and which may be affixed to door panel 10. More specifically, handle 20 is, in the embodiment shown in FIG. 1, pivotably mounted on plate 70 to be turned/rotated so as to open and close the door. Linkages 30 and 40 are also mounted on plate 70 to be pivoted about a common axis, where this axis need not necessarily, although may if desired, coincide with the axis of rotation of handle 20. Connector 60, which in some embodiments may be a string, wire, or some other line or mechanical linkage, is affixed to a distal end of linkage 30, and extends to second release mechanism 85 to actuate its door release. Similarly, linkage 40, when actuated, depresses switch 50, which in turn triggers a lock mechanism positioned proximate the door (e.g., mounted on the vehicle near the door) and engaging loop 80, to disengage from loop 80 and thereby unlock the door for opening.

Mounting plate 70 may be affixed to the door panel 10 in any suitable manner such that it is sufficiently rigid to allow for locking and unlocking of the door, such as by a number of fasteners 75. Here, fasteners 75 are shown as rivets, screws, nuts and bolts, or the like, but may also be any other fastener capable of rigidly affixing mounting plate 70 to door panel 10, such as an adhesive, a weld, or the like. Any number and location of fasteners 75 is contemplated.

Door panel 10 may be affixed to a door, such as a sliding door or interior bulkhead door of a vehicle, in any suitable manner that is sufficiently rigid to allow for locking and unlocking of the door, such as by a number of fasteners 15. Similar to fasteners 75, fasteners 15 are shown as rivets, screws, nuts and bolts, or the like, but may also be any other fastener capable of rigidly affixing panel 10 to a door, such as an adhesive, a weld, or the like. Any number and location of fasteners 15 is contemplated.

In some embodiments, handle 20 may have a shaft 90 that extends through mounting plate 70 (and door panel 10), to be coupled to a limiter 100 shaped to prevent excessive and/or undesired motion of handle 20 and the lock/unlock mechanisms. As shown in FIG. 2, limiter 100 may have a first flange 120 that acts as a travel limit for handle 20, extending between prongs 140 and 150 that stop excessive rotational travel of limiter 100 and thus handle 20. Additionally, limiter 100 has a second flange 130 extending to engage an inertia catch 110. In some embodiments of the disclosure, inertia catch 110 is a free-hanging lever whose inertia prevents rotation of second flange 130, and thus handle 20, in the event of sudden acceleration such as in a collision of the vehicle containing the door to which panel 10 is affixed.

As above, switch 50 may be a portion of a lock and unlock mechanism. Switch 50 may be any manipulable portion of any suitable lock and unlock mechanism capable of locking and unlocking a door. In some embodiments, switch 50 may be a switch such as a microswitch which, when depressed, generates an electrical signal across an air gap, to trigger a lock and unlock mechanism (not shown) located proximate to the door. Triggered in this manner, the lock and unlock mechanism may act to unlock the door, such as by withdrawing a latch, catch, or bolt from loop 80. In particular, switch 50 may generate a charge on plate 160, which may generate a voltage across another plate of the lock and unlock mechanism, triggering the lock and unlock mechanism to unlock the door. Accordingly, switch 50 may be considered as a portion of a release mechanism that unlocks its door when depressed by rotation of handle 20.

Release mechanism 85 may be any mechanism or portion thereof capable of catching and holding an open door and releasing it when desired for closing. In some embodiments, release mechanism 85 may be an electronic or electromagnetic lock that may automatically latch onto a portion of the door when it is opened fully. Rotating handle 20 in the first direction (e.g., away from door panel 10) may then engage linkage 30 to place tension on connector 60, triggering the electronic or electromagnetic lock to retract the latch and release the door for closing.

Door panel 10 may be affixed to any door, or any movable object that may be locked and unlocked for some desired motion. As one example, door panel 10 may be affixed to a door such as a vehicle door, and as a specific example may be affixed to an interior bulkhead door of a commercial vehicle such as a package or object delivery vehicle. While the door to which panel 10 may be affixed is not shown, one of ordinary skill in the art will observe that this door may be any movable door.

Figure 3:
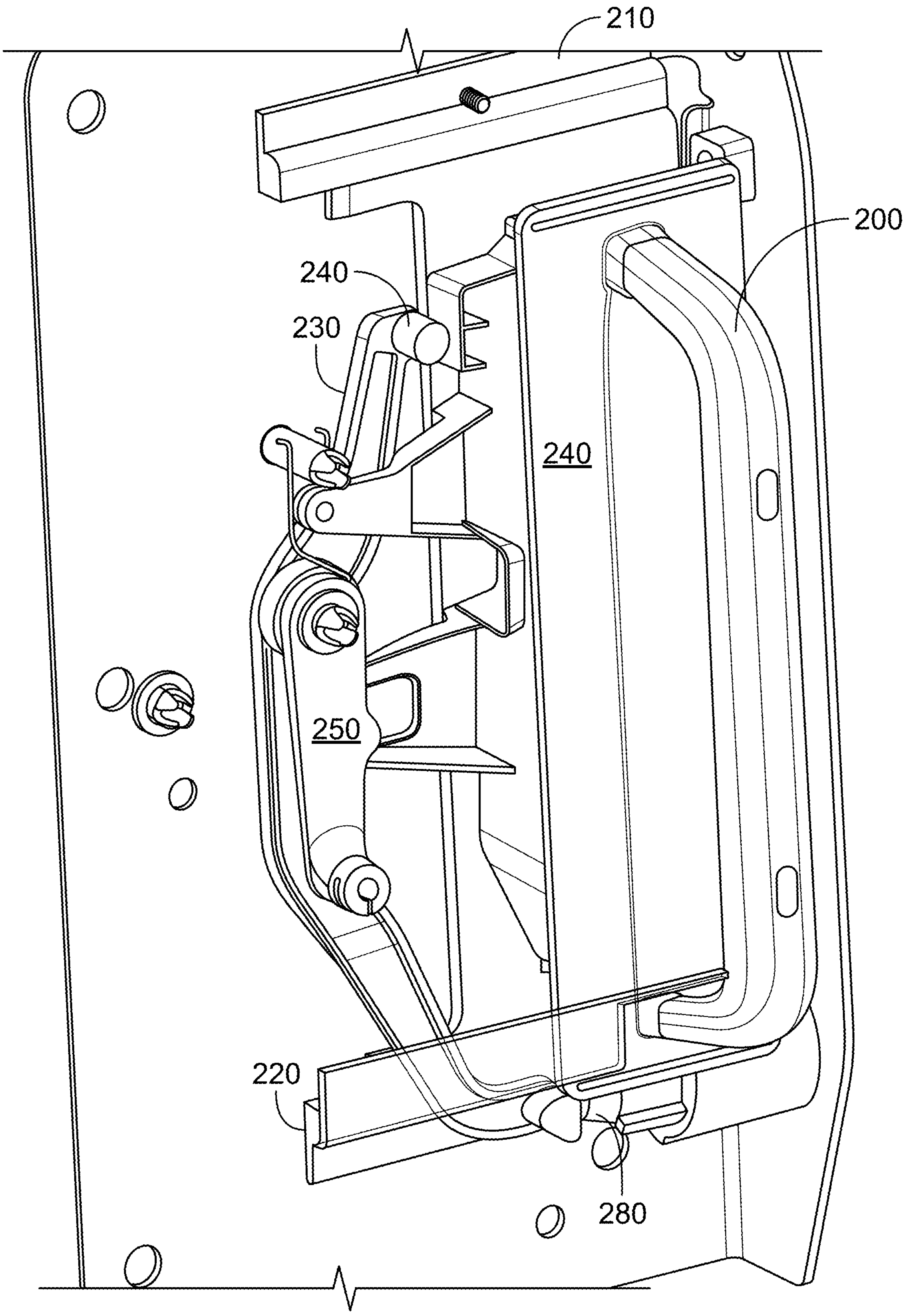
FIG. 3 is a side view of a side of a door panel showing a translational handle and integrated release mechanisms, in accordance with embodiments of the disclosure.
Figure 4:
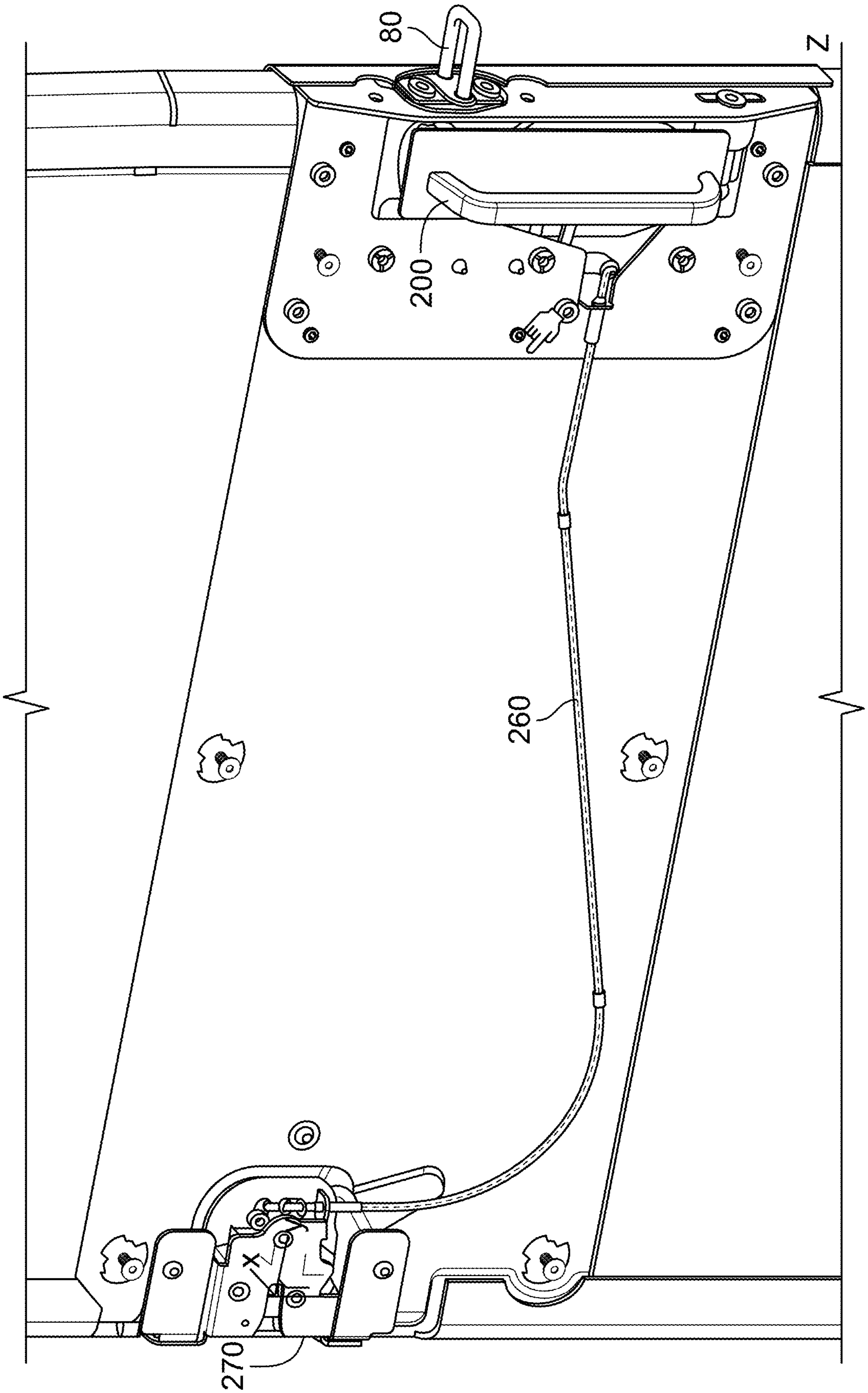
FIG. 4 is a side view of an opposite side of the door panel of FIG. 3, showing an opposite side of the handle and integrated release mechanisms, in accordance with embodiments of the disclosure.

As noted previously, handle 20 may be any handle capable of actuating the above described release mechanisms. In particular, handle 20 may be a rotational handle as shown in FIG. 1, or may be any other type of handle or device for actuating the above described release mechanisms. As one example, the handle may be a translational handle configured such that translation, e.g., sideways movement, in different directions may actuate the two release mechanisms. FIG. 3 is a side view of a side of a door panel showing a translational handle and integrated release mechanisms, in accordance with embodiments of the disclosure. FIG. 4 is a side view of an opposite side of the door panel of FIG. 3, showing an opposite side of the handle and integrated release mechanisms, in accordance with embodiments of the disclosure. Here, handle 200 is mounted on two tracks 210, 220 for translational movement. Handle 200 may slide back and forth along tracks 210 and 220. In operation, a user may slide handle 200 rightward (e.g., away from linkage 250) in the view of FIG. 3, engaging linkage 250 to pull wire or line 260, triggering a release mechanism 270 that may be similar to release mechanism 85. Conversely, a user may slide handle 200 leftward (e.g., towards linkage 250) in the view of FIG. 3, engaging linkage 230 via pin 240 to depress a switch 280 similar to switch 50, triggering a lock and unlock mechanism as above, to unlock and release loop 80.

In this manner, handle 200 provides conditional engagement of the two release mechanisms 270, 280. More specifically, when slid rightward in the view of FIG. 3, handle 200 engages release mechanism 270 but not release mechanism 280, to allow release of the door for closing. Conversely, when slid leftward in the view of FIG. 3, handle 200 engages release mechanism 280 but not release mechanism 270, allowing the door to be unlocked and opened. In particular, when slid rightward, handle 200 engages linkage 250 but pulls away from, and thus does not engage, linkage 230 or pin 240. And when slid leftward, handle 200 engages pin 240 and linkage 230 but disengages from linkage 250. Accordingly, handle 200 engages only one release mechanism in each direction along which it is manipulated. It is further noted that handles of embodiments of the disclosure may be of any construction, allowing for triggering of release mechanisms in any manner, along any directions of movement.

Figure 5:
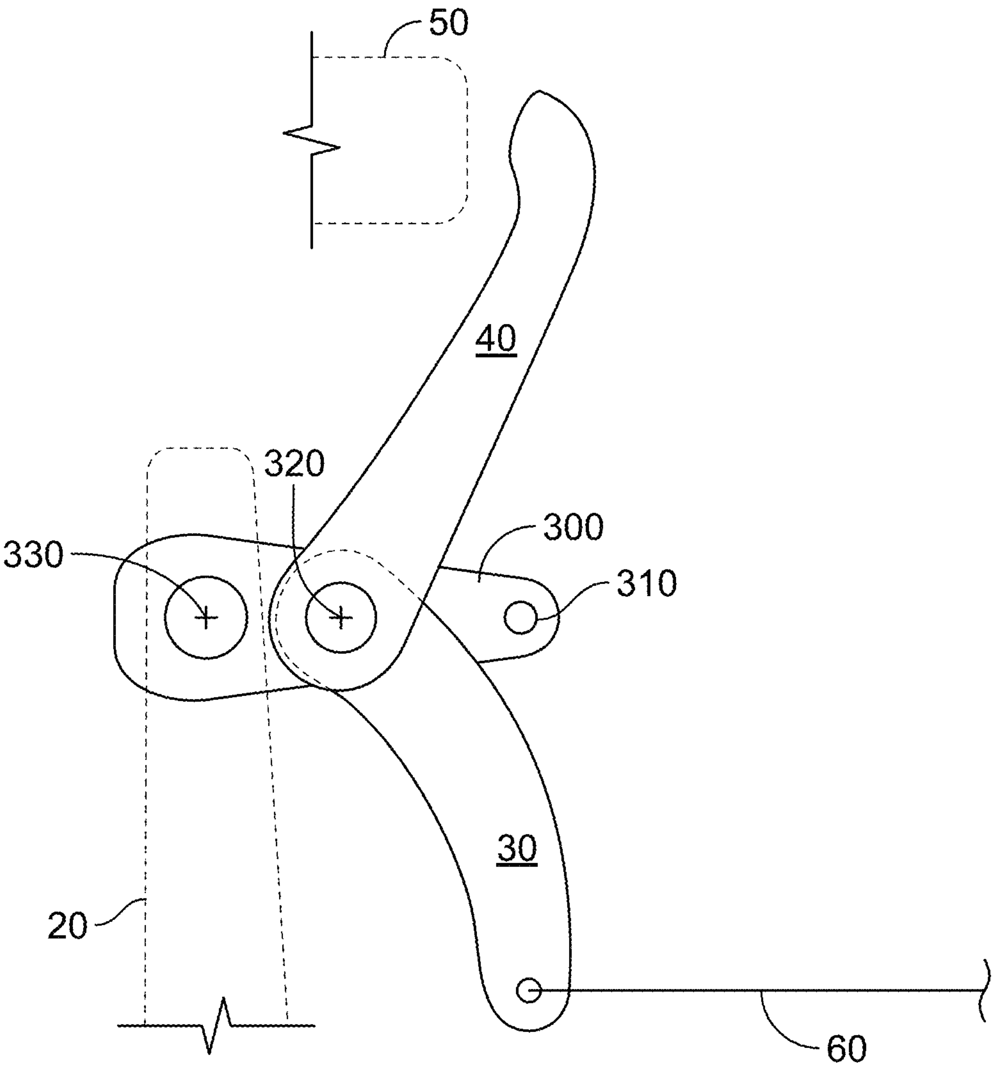
FIG. 5 is a side view showing further details of a mechanism for conditionally engaging different release mechanisms based on handle rotation direction, in accordance with embodiments of the disclosure.

Embodiments of the disclosure contemplate any system or device by which the linkages 30 and 40 of FIGS. 1-2 may be conditionally engaged according to the direction by which handle 20 is manipulated. FIG. 5 illustrates one such example. FIG. 5 is a side view showing further details of a mechanism for conditionally engaging different release mechanisms based on handle rotation direction, in accordance with embodiments of the disclosure. More specifically, FIG. 5 illustrates handle 20 pivotably located off-axis from coaxially pivotable linkages 30 and 40. Here, handle 20 and member 300 are each rigidly affixed to pivotable shaft 330, while linkages 30 and 40 are rigidly affixed to pivotable shaft 320. As can be observed from FIG. 5, member 300 has a pin 310 extending therefrom to engage linkage 40 when handle 20 is rotated in the counterclockwise direction, depressing switch 50 and unlocking the door for opening. Conversely, when handle 20 is rotated in the clockwise direction (e.g., away from the door panel), pin 310 engages linkage 30, placing connector 60 in tension and triggering release mechanism 85 to release the door for closure. In this manner, handle 20 may actuate one release mechanism when rotated or turned in one direction, and actuate the other release mechanism when rotated or turned in the other direction. It is noted that embodiments of the disclosure contemplate any construction by which handle 20 may conditionally and directionally engage the above described release mechanisms.

As another example, handle 20 may be located coaxially with each of linkages 30 and 40, with each rigidly affixed to the same pivotable shaft, so that rotation of handle 20 in the clockwise direction (in the view of FIG. 1) rotates linkage 30 to place connector 60 in tension, triggering release mechanism 85, and rotates linkage 40 to disengage from switch 50. Similarly, rotation of handle 20 in the counterclockwise direction would engage linkage 40 to depress switch 50, unlocking loop 80 and unlocking the door, while releasing tension from connector 60 and avoiding triggering of release mechanism 85.

Figure 6:
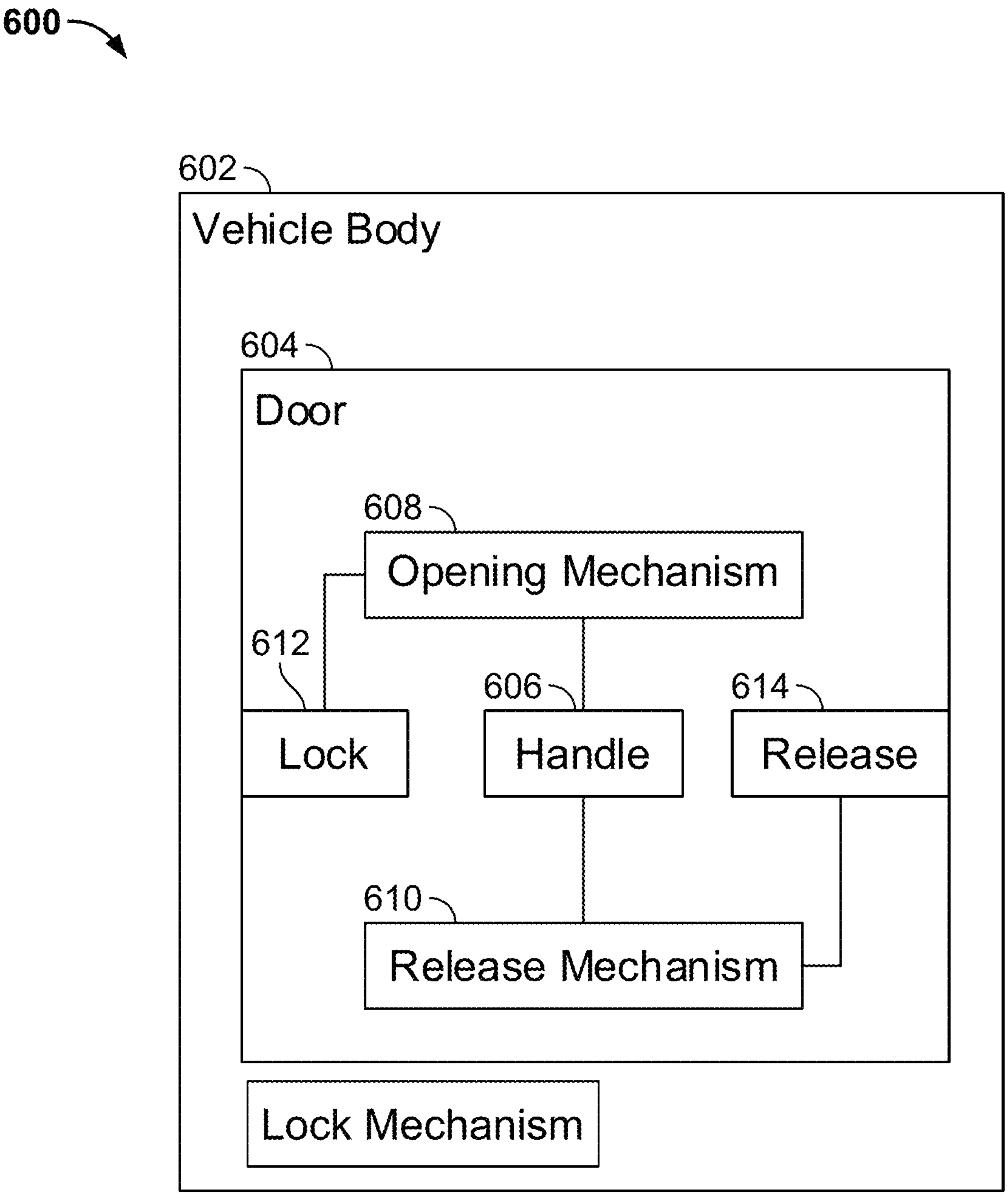
FIG. 6 is a block diagram illustration of an exemplary vehicle having a door panel with integrated release mechanisms, constructed in accordance with embodiments of the disclosure.

FIG. 6 illustrates vehicle 600 that includes a vehicle door that comprises an integrated opening and closing mechanism. Vehicle 600 may incorporate the door panels and corresponding handles and release mechanisms of FIGS. 1-5, in accordance with some embodiments of the disclosure. Vehicle 600 may be any vehicle capable of supporting a door within, including as examples a car, truck, van, recreational vehicle, sports utility vehicle, any commercial vehicle such as a delivery vehicle, tractor-trailer or semi-trailer truck, or the like.

Vehicle 600 includes a vehicle body 602. Attached or otherwise coupled to vehicle body 602 is door 604, which includes a handle 606 and integrated opening and release mechanisms 608 and 610 for locking/unlocking the door 604, and releasing door 604 from its open position, respectively. More specifically, opening mechanism 608 (e.g., first release mechanism 25) is connected to a lock 612, which may be at least a portion of a mechanism for locking/unlocking door 604, e.g., switch 50 and loop 80. Release mechanism 610 (e.g., release mechanism 85) is connected to release 614 (e.g., a catch or hold mechanism), which may be at least a portion of a mechanism for releasing door 604 from a state of being held in its open position. In some embodiments, door 604 may be a sliding door slidably coupled to vehicle body 602 to slide back and forth, allowing ingress and egress between, for example, passenger compartments and cargo compartments of vehicle 600. In some further embodiments, door 604 may be pivotably coupled to vehicle body 603 to pivot or rotate between open and closed configurations. Any configuration and movement of door 604 is contemplated.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any handle may be employed, to be manipulated in any direction to trigger a release mechanism. The release mechanisms may be any mechanisms capable of locking/unlocking a door, or catching/releasing a door. Triggering of a release mechanism by the handle may be performed by any suitable device or construction. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. An actuation system, the system comprising:

a handle coupled to a door, the handle configured to be manipulable in first and second directions;

a first release mechanism configured to release the door for closure based at least on the handle manipulated in the first direction;

a second release mechanism comprising a switch configured to cause a lock mechanism external to the door to unlock the door for opening based at least on the handle manipulated in the second direction;

a first linkage configured to actuate the first release mechanism by directly contacting the first release mechanism when the handle is manipulated in the first direction; and a second linkage configured to actuate the second release mechanism by directly contacting the switch of the second release mechanism when the handle is manipulated in the second direction.

2. The system of claim 1, wherein the handle is further configured for rotation in the first and second directions, the first direction being a rotational direction opposite to the second direction.

3. The system of claim 1, wherein the handle is further configured for translation in the first and second directions, the first direction being a direction opposite to the second direction.

4. The system of claim 1, wherein the first release mechanism comprises the first linkage, and further comprising a hold mechanism having an end coupled to the first linkage to be manipulated by the first linkage when the first linkage is actuated by manipulation of the handle in the first direction, the hold mechanism configured to release the door when the end is manipulated by the first linkage.

5. The system of claim 1, wherein the first release mechanism does not release the door for closure when the handle is manipulated in the second direction.

6. The system of claim 5, wherein the second linkage is fixed for movement with the handle to actuate the second release mechanism, and wherein the second release mechanism does not unlock the door for opening when the handle is manipulated in the first direction.

7. The system of claim 1, wherein the switch causes an electrical signal to be generated across an air gap to trigger the lock mechanism external to the door to unlock the door.

8. The method of claim 1, wherein the switch is further configured to cause movement of the lock mechanism to unlock the door for opening.

9. The method of claim 1, wherein the switch is further configured to cause a change in electricity provided to the lock mechanism to unlock the door for opening.

10. A vehicle, the vehicle comprising:

a vehicle body having an interior bulkhead wall;

a door coupled to the bulkhead wall;

a handle coupled to the door, the handle configured to be manipulable in first and second directions;

a first release mechanism configured to release the door for closure based on the handle being manipulated in the first direction; and a second release mechanism comprising a switch configured to cause a lock mechanism external to the door to unlock the door for opening based on the handle being manipulated in the second direction; and a linkage configured to actuate the second release mechanism by contacting the switch of the second release mechanism when the handle is manipulated in the second direction.

11. The vehicle of claim 10, wherein the handle is further configured for rotation in the first and second directions, the first direction being a rotational direction opposite to the second direction.

12. The vehicle of claim 10, wherein the handle is further configured for translation in the first and second directions, the first direction being a direction opposite to the second direction.

13. The vehicle of claim 10, further comprising:

a first linkage configured for actuation by the handle when the handle is manipulated in the first direction, the first linkage configured to actuate the first release mechanism by directly contacting the first release mechanism when the handle is manipulated in the first direction, wherein the linkage configured to actuate the second release mechanism is a second linkage.

14. The vehicle of claim 10, wherein the first release mechanism is further configured to release the door for closure when the handle is manipulated in the first direction but not in the second direction; and wherein the second release mechanism is further configured to release cause the lock mechanism external to the door to unlock the door for opening when the handle is manipulated in the second direction but not in the first direction.

15. The vehicle of claim 13, wherein the first release mechanism comprises a hold mechanism having an end coupled to the first linkage to be manipulated by the first linkage when the first linkage is actuated by manipulation of the handle in the first direction, the hold mechanism configured to release the door when the end is manipulated by the first linkage.

16. A method, comprising:

releasing a door of a bulkhead wall for closing, by manipulating a handle of the door in a first direction but not in a second direction, wherein a first linkage actuates a first release mechanism to release the door for closing by directly contacting the first release mechanism when the handle is manipulated in the first direction; and releasing the door for opening, by manipulating the handle of the door in the second direction but not in the first direction, wherein:

a second linkage actuates a second release mechanism to cause a lock mechanism external to the door to unlock the door for opening by directly contacting a switch of the second release mechanism when the handle is manipulated in the second direction; and the second direction is different from the first direction.

17. The method of claim 16, wherein the first and second directions are translational or rotational directions, the first direction being a direction opposite to the second direction.

18. The method of claim 16, wherein the manipulating the handle in the first direction further comprises actuating the first linkage by the handle when the handle is manipulated in the first direction, the first linkage thereby manipulating an end of a hold mechanism coupled to the first linkage, and the hold mechanism thereby releasing the door.

19. The method of claim 18, further comprising actuating the first linkage when the handle is manipulated in the first direction but not in the second direction.

20. The method of claim 16, further comprising actuating the second linkage when the handle is manipulated in the second direction but not in the first direction.

* * * * *